United States Patent Office 3,422,332
Patented Jan. 14, 1969

3,422,332
FULL-WAVE INDUCTIVE LOAD CONTROL
Edward H. Dinger and Willie L. McNair, Waynesboro, Va., assignors to General Electric Company, a corporation of New York
Filed Apr. 18, 1966, Ser. No. 543,395
U.S. Cl. 318—331                         15 Claims
Int. Cl. H02p 5/00

ABSTRACT OF THE DISCLOSURE

A circuit for controlling full wave power to a motor so that motor speed is unaffected by load current at the beginning of each half cycle. Controlled rectifiers which regulate the speed are prevented from firing until a selected phase angle in each half cycle of rectified voltage is reached.

---

This invention relates to inductive load control circuits, and more specifically, to full-wave motor control circuits which can regulate the speed of the motor during each half cycle of source voltage.

In full-wave motor control circuits where motor speed is regulated by controlling the power supplied to the motor armature winding during each half cycle of the source voltage, the inductive nature of the armature windings may cause a premature application of source power to the armature at the beginning of a half cycle of the source voltage. For example, where the power supplied to the motor armature is regulated by a phase-controlled, controlled rectifier circuit, the armature inductance may cause a continuous current flow through the controlled rectifier after the source voltage has decreased to zero. This current flow may continue during the beginning of the succeeding half cycle of the source voltage. If it is greater than the holding current level of the controlled rectifier, once the controlled rectifier is forward biased by the source voltage, the controlled rectifier is prematurely fired, thereby losing its regulating capability.

It is a primary object of this invention to provide a circuit for controllably supplying full-wave power to an inductive load.

It is an object of this invention to provide a full-wave motor control circuit which can effectively regulate motor speed during each half cycle of source voltage.

It is another object of this invention to provide a full-wave motor control circuit in which motor speed regulation is unaffected by current flow through the motor winding at the beginning of a half cycle of the source voltage.

It is a further object of this invention to provide an improved full-wave motor control circuit for the regulation of the motor over its entire speed range.

Briefly stated, and in accordance with one aspect of this invention, source voltage is fed through a full-wave rectifier circuit and through a controlled rectifier, the firing of which is phase controlled by a first circuit means to regulate the speed of the motor. Commutating means are connected to the controlled rectifier and to the motor armature. Second circuit means responsive to the voltage level across the armature are connected to the armature and the first circuit means to prevent the firing of the controlled rectifier until a selected phase angle is reached in each half cycle of the rectified voltage. The second circuit means are so constructed and arranged with regard to the first circuit means and the armature that the selected phase angle varies inversely in magnitude with the voltage level at the armature so that an approximately constant maximum armature current is maintained over the speed range of the motor. Furthermore, the components of said full-wave circuit means and said controlled rectifier may be so selected and arranged as to terminate the flow of current through the controlled rectifier for at least its minimum turn-off time between succeeding cycles.

While the specification concludes with claims particularly pointing out and distinctly claiming the subject matter of this invention, the following description of the invention, taken in conjunction with the accompanying drawings, should be referred to for a better understanding of the manner and process of making and using this invention.

Figure 1:
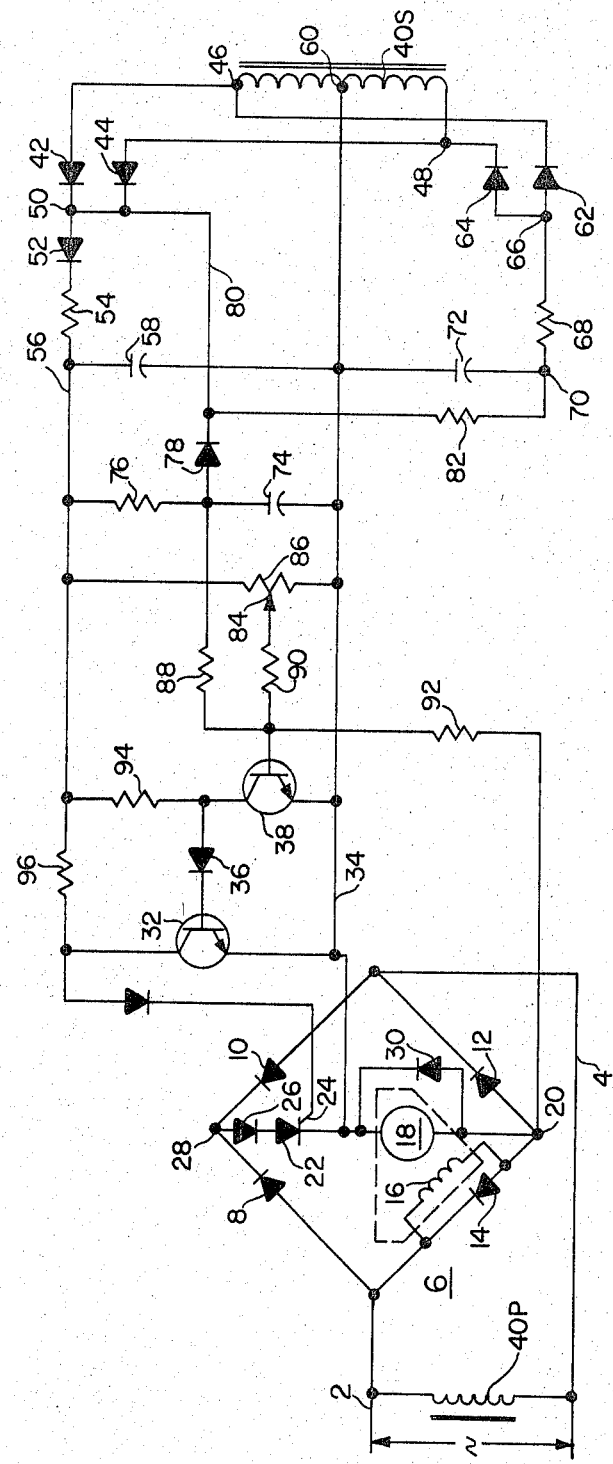
FIGURE 1 is a schematic diagram of a basic motor control circuit used in accordance with this invention.

FIGURE 1 shows a basic motor control circuit used in accordance with this invention. Alternating-current power is coupled from a source (not shown) and through busses 2 and 4 to a full-wave rectifier circuit comprising bridge circuit 6, including power diodes 8, 10, 12, and 14. A motor field winding 16 is coupled across the diode 14. The field winding 16 is energized by a half-wave rectified current flowing through the diode 12. Alternatively, this field winding may be coupled across the bridge circuit 6 so that it is energized by full-wave rectified current.

A motor armature 18 is connected across diagonals of the bridge circuit 6 to be controllably energized by the bridge circuit. One side of the armature is connected to junction 20 of the bridge circuit 6, while the other side is connected from cathode to anode of a controlled rectifier 22, having a gate electrode 24, and from cathode to anode of a diode 26 to junction 28. The diode 26 may be considered a portion of a full-wave rectifier circuit, also including the bridge circuit 6. A free-wheeling diode 30 is connected across the motor armature 18. It prevents the voltage across the armature from being driven negative in polarity at the end of each half cycle of the source voltage by energy stored in the armature inductance. By providing a path for armature current near the end of each half cycle of the source voltage, the diode 30 allows the controlled rectifier 22 to regain control of the input power at the end of each half cycle of the input voltage, as will be more fully explained below.

A circuit which controls the firing of the controlled rectifier 22, and thus the portion of each half cycle of source voltage during which the controlled rectifier 22 couples energizing current to the armature 18, is connected across the gate and cathode electrodes of the controlled rectifier 22. The collector electrode of a transistor 32 is connected to the gate electrode 24, while the emitter electrode of this transistor is connected to a common bus 34. The base electrode of the transistor 32 is coupled from cathode to anode of a diode 36 to the collector electrode of a transistor 38, having its emitter electrode coupled to the bus 34.

A transformer 40, having a primary winding 40P and a secondary winding 40S is the source of operating power for the transistors 32 and 38 and the source of gate current for the controlled rectifier 22. The primary winding 40P is connected across the A-C supply busses 2 and 4. A pair of rectifiers 42 and 44, having their anodes connected to the transformer terminals 46 and 48, respectively, and then cathodes connected to the junction 50 provides a full-wave rectified voltage of positive polarity at a junction 50. This rectified voltage is coupled through a diode 52 and a resistor 54 to a bus 56. The positive voltage difference between the bus 56 and the bus 34 is stored across a capacitor 58 having one end connected through the bus 34 to a center tap terminal 60 on the secondary winding 40S. A pair of diodes 62 and 64 provide a rectified voltage of negative polarity at the junction 66. The anodes of the diodes 62 and 64 are connected to a junction 66, while the cathodes are connected to the terminals 46 and 48, respectively. This negative voltage is coupled through a resistor 68 to a junction 70 where it is maintained across a capacitor 72.

A ramp-like or sawtooth voltage wave is generated across a capacitor 74 during each half cycle of the voltage at the secondary winding 40S. Current from the positive voltage bus 56 is coupled through a resistor 76 to charge the capacitor 74. A diode 78 is connected between the capacitor 74 and the junction 50 by a bus 80. A resistor 82 interconnects the bus 80 and the junction 70. The capacitor 74 begins charging at the beginning of each half cycle of the voltage across the secondary winding 40S and continues to charge until the voltage level thereacross is greater than that at the bus 80. Thereafter, the capacitor is discharged through the diode 78.

The input circuit of the transistor 38 is biased by a ramp and pedestal voltage comprising a combination of the sawtooth voltage across the capacitor 74, a reference voltage level developed at the slidewire 84 of a potentiometer 86, and the voltage across the armature 18, usually the back electromotive force of the armature. The sawtooth voltage is coupled through a resistor 88 and applied across the base and emitter electrodes of the transistor 38. The reference voltage at the slidewire 84 is coupled across these electrodes by means of a resistor 90. The armature voltage is coupled thereacross by means of a resistor 92 and the bus 34 in such a manner that its polarity is opposite from that of the reference voltage. The collector of the transistor 38 is biased by means of a resistor 94 and the bus 56. A resistor 96 carries current from the bus 56 to the gate electrode 24 and the collector of the transistor 32.

When the circuit shown in FIGURE 1 operates during any half cycle of the source voltage when the bus 2 is positive in polarity with respect to the bus 4, current may flow from the source through the bus 2, the diode 8, the diode 26, the controlled rectifier 22, the motor armature 18, the diode 12, and the bus 4 to energize the motor armature 18. However, gate current must flow through the gate electrode 24 to cause the controlled rectifier 22 to begin to conduct.

During this half cycle, current also flows from the bus 2 and through the motor field winding 16 and the diode 12 to energize the motor field winding 16. During a succeeding half cycle when the bus 2 is negative in polarity with respect to the bus 4, the diode 14 shunts current from the field winding 16, acting as a freewheeling diode.

Figure 2:
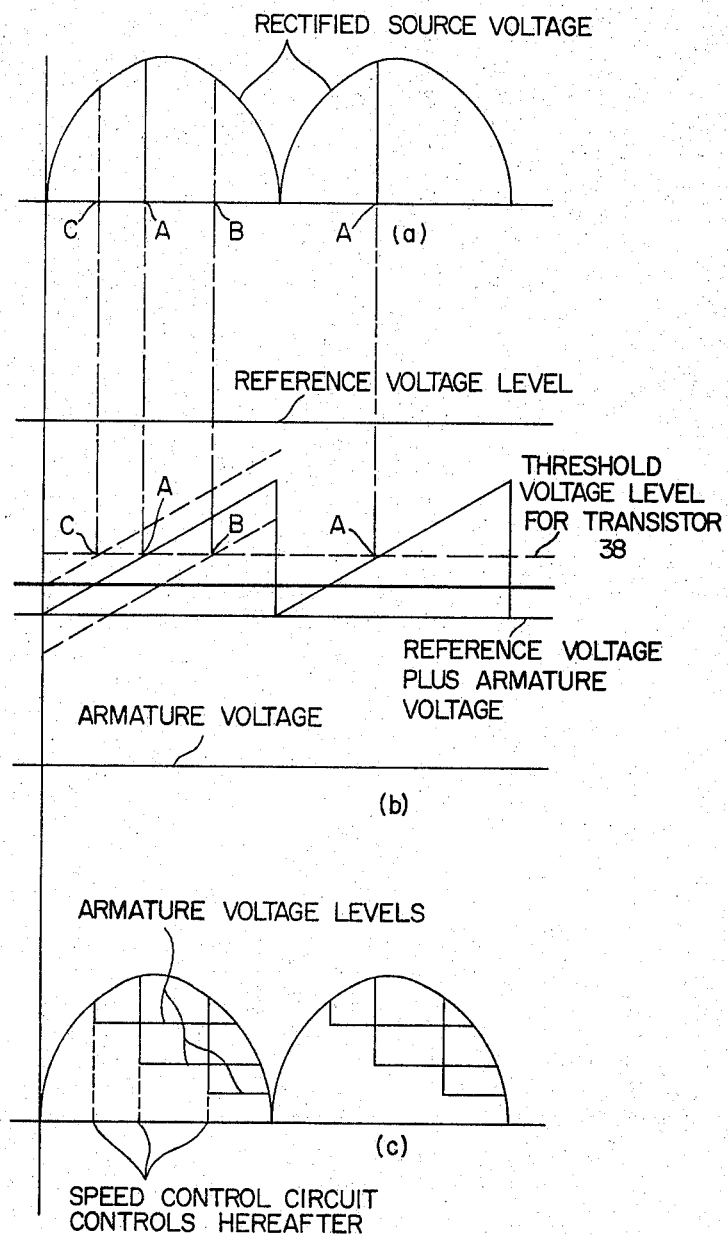
FIGURE 2 shows a voltage diagram used to explain the operation of the motor control circuits.

FIGURE 2 should be referred to with respect to the operation of the portion of the FIGURE 1 circuit which controls the flow of gate current to the controlled rectifier 22. Whenever the transistor 32 is conducting, the controlled rectifier 22 cannot begin to conduct because it has no gate current. If the transistor 32 stops conducting, gate current flows from the resistor 96 to turn on the controlled rectifier 22.

The transistor 38 controls the conductivity state of the transistor 32, and ultimately controls the firing of the controlled rectifier 22. When the transistor 38 is nonconducting, a positive voltage at its collector, larger than that at the base electrode of the transistor 32, causes base current to flow in the transistor 32 so that it conducts. The controlled rectifier 22 cannot be fired at this time. Once the transistor 38 conducts, the transistor 32 becomes nonconducting and the controlled rectifier 22 is fired.

FIGURE 2 shows the voltage waves applied between the base and emitter electrodes of the transistor 38, along with a representation of the source voltage applied to the motor armature winding 18. FIGURE 2a shows the rectified source voltage, while FIGURE 2b is a representation of the voltage across the base and emitter electrodes of the transistor 38. Referring to FIGURE 2b, the reference voltage level coupled from the slidewire 84 is shown to be positive in polarity, while the feedback voltage level is negative in polarity so as to oppose the effects of the reference voltage level at the base electrode of the transistor 38. The sum of the reference voltage and the feedback voltage is shown to be a pedestal voltage which is slightly negative in polarity. Since the NPN transistor 38 has a positive threshold voltage level, merely adding the reference voltage and the feedback voltage at the base electrode of the transistor 38 does not turn it on. However, the sawtooth voltage wave developed across the capacitor 74 is also coupled across the base and emitter electrodes of the transistor 38. When the sum of the ramp and pedestal voltages comprising the sawtooth voltage, the reference voltage, and the feedback voltage equals the threshold voltage level of the transistor 38, as at a point marked A in FIGURE 2b, the transistor 38 turns on and the transistor 32 is turned off. Therefore, gate current flows through the gate electrode 24 to turn on the controlled rectifier 22. Thereafter, the remaining portion of the rectified source voltage is applied across the motor armature 18 to energize it.

Whenever the feedback voltage level changes, the point at which the sum of the reference voltage, feedback voltage, and sawtooth voltage equal the threshold voltage level of the transistor 38 changes as well. For example, the feedback voltage becomes more negative, that is, it increases in magnitude, whenever the speed of the motor increases with a decrease in the motor load. The sum of the reference voltage plus the feedback voltage also becomes more negative. When the sawtooth voltage is added to this sum, total voltage reaches the threshold voltage lever later in a half cycle of the rectified source voltage, indicated at B in FIGURE 2b. The transistor 38 is turned on later in the half cycle, and a lesser portion of the source voltage is applied to the motor armature 18. With the motor armature energized to a lesser extent, the motor tends to slow down.

The feedback voltage level decreases in magnitude, that is, it becomes less negative, as the back electromotive force at the motor armature 18 decreases with a decrease in the motor speed as the motor is being loaded. The sum of the reference voltage plus the feedback voltage also becomes less negative. When the sawtooth voltage wave is added to this sum, the total voltage crosses the threshold voltage level of the transistor 38 earlier in each half cycle of the reference source voltage. This is shown at C in FIGURE 2. Therefore, the controlled rectifier 22 is turned on earlier in each half cycle of the source voltage so that more power is applied to the motor armature 18.

From the above, it can be seen that the magnitude of the back electromotive force determines how much of each rectified voltage wave is applied to the motor armature 18.

As shown in FIGURES 1 and 2a, the subject full-wave motor control circuit must be capable of controlling each of two succeeding half cycles of the input voltage with a single controlled rectifier. Since the motor armature 18 is an inductive load for the controlled rectifier, it tends to maintain a constant current through the controlled rectifier as the input voltage decreases in magnitude. The controlled rectifier 22 must be turned off at the end of each half cycle of source voltage so that it can control the next half cycle of the source voltage. Commutation of the controlled rectifier 22 is facilitated by means of the free-wheeling diode 30 and the voltage drops across the diodes in the rectifier bridge, across the diode 26 and across the controlled rectifier 22 itself.

Whenever the inductive motor armature 18 attempts to maintain a steady current flow through the controlled rectifier 22 near the end of a source voltage half cycle, the voltage induced thereacross tends to forward bias the diode 30. This diode shunts the current from the armature 18 and limits the voltage drop thereacross to that of the diode 30. Thus, the current flow through the armature 18 is allowed to go to zero at the end of each half cycle of the source voltage.

Furthermore, the combination of two conducting diodes of the bridge circuit 6 with the diode 26 in the full-wave rectifier circuit and the controlled rectifier 22 cause the controlled rectifier to stop conducting prior to the end of each half cycle. Assume that each of the bridge diodes, the controlled rectifier 22, and the diode 30 has a forward voltage drop of .5 volt. The voltage drop across the diode 30 (.5 volt) is subtracted from the sum of the voltage drops across the diodes 8, 12, and 26 and the controlled rectifier 22 (2.0 volts) to find the minimum source voltage needed (1.5 volts) to forward bias the controlled rectifier 22. Thus, the controlled rectifier 22 stops conducting when the source voltage level is below 1.5 volts. It may begin conducting once again when the voltage of the succeeding half cycle is greater than 1.5 volts if it is fired. If the time between these two 1.5-volt levels is greater than the minimum "turn-off time" of the controlled rectifier 22, the gate electrode 24 regains control of the controlled rectifier 22. The diode 26 may be eliminated or a greater number of diodes may be added in series therewith to add to or decrease the time during which the controlled rectifier 22 is turned off. As an alternative, diodes having greater forward voltage drops may be used. An important feature of this portion of this invention is that the sum of the voltage drops across the conducting diodes be such that the source cannot cause the controlled rectifier to conduct between succeeding half cycles for a time which is longer than the minimum "turn-off time" of the controlled rectifier.

Figure 3:
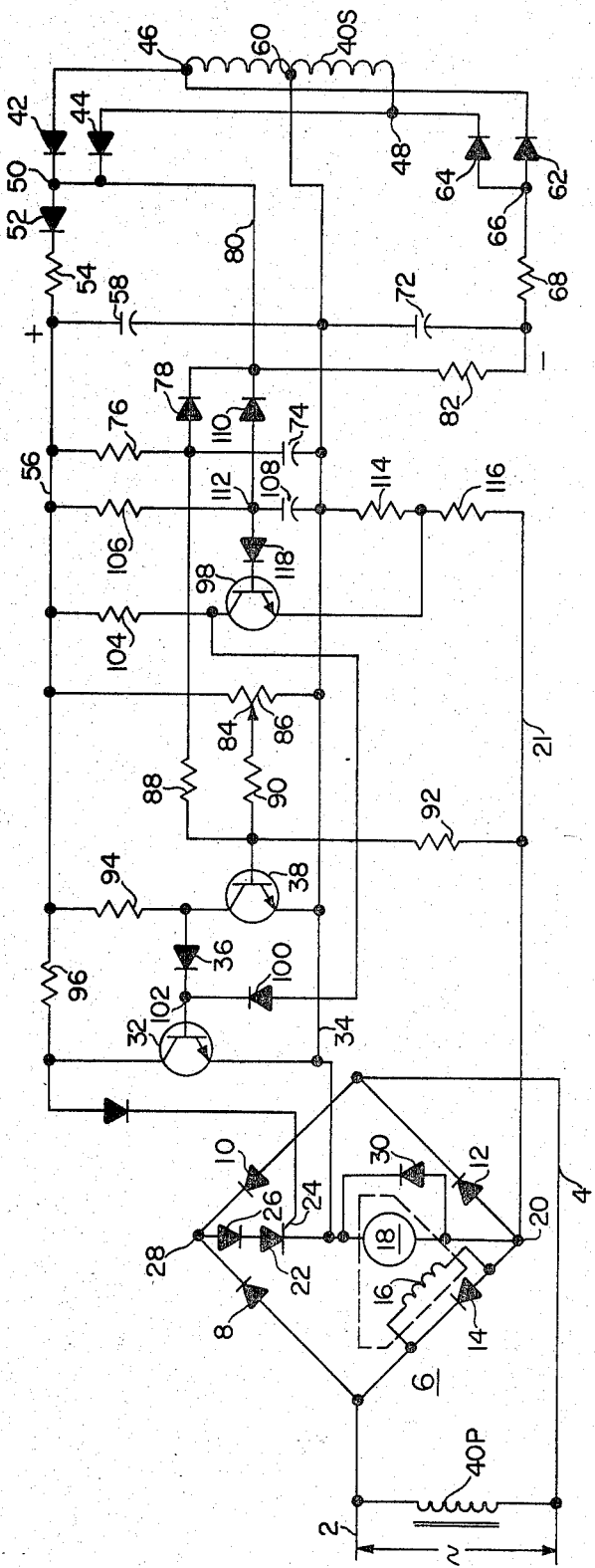
FIGURE 3 is a schematic diagram of a motor control circuit including a current limit circuit used in accordance with one aspect of this invention.

The motor control circuit shown in FIGURE 3 is similar to that shown in FIGURE 1 except that it also includes a current limit circuit which programs a maximum angle of firing of the controlled rectifier 22 as a function of the armature back electromotive force. Similar circuit components in FIGURES 1 and 3 are marked with identical numerals.

The circuit shown in FIGURE 3 controls current flow through the armature 18 by preventing the controlled rectifier 22 from firing earlier than a prescribed angle for each magnitude of back electromotive force, regardless of whether the voltage sensitive part of the speed control circuit requires the controlled rectifier to fire. The current limit circuit comprises a transistor 98 having its collector electrode coupled from anode to cathode of a diode 100 to a junction 102 at the emitter electrode of the transistor 32. A resistor 104 provides a bias from the bus 56 to the collector electrode of the transistor 98, while a resistor 106 couples current from the bus 56 to charge a capacitor 108. A diode 110 coupled between the bus 80 and a junction 112 causes a sawtooth voltage to be generated across the capacitor 108.

A pair of resistors 114 and 116 are coupled across the armature 18 by the junction 20 and the bus 34. To bias the transistor 98 with a ramp and pedestal voltage which is a function of the armature voltage and the sawtooth voltage developed across the capacitor 108, its emitter electrode is connected between the resistors 114 and 116, while its base electrode is coupled through a diode 118 to the junction 112.

The current limit circuit is particularly advantageous when operating the full-wave motor control circuit without filtering at low speeds or with light loads. If the motor armature inductance is such that current is circulating through the armature 18 and the diode 30 at the beginning of a half cycle of source voltage, the voltage across the armature is held to a small negative value by the voltage drop across the diode 30. Without the current limiting circuit, the transistor 38 is turned on early in this half cycle regardless of the actual back electromotive force at the armature 18, since this small voltage is sensed as the feedback voltage of FIGURE 2b.

The current limiting circuit, on the other hand, prevents the speed control circuit from firing the controlled rectifier 22 until a predetermined angle of a half cycle of the input voltage, which angle varies inversely with the magnitude of the back electromotive force.

In operation, as long as the transistor 98 is nonconducting, the diode 100 couples a positive voltage to the junction 102 to keep the transistor 32 conducting. The controlled rectifier cannot be fired at this time.

The pedestal-like voltage across the resistor 114 is of a polarity such that it adds to the sawtooth voltage across the capacitor 108. When the armature voltage, and thus the voltage across the resistor 114, is small, the transistor 98 is turned on late in a half cycle of the input voltage and the speed control circuit becomes effective late in this half cycle. However, when the armature voltage increases, signifying that the back electromotive force is being sensed once again, the transistor 98 begins conducting earlier in the half cycle. Therefore, the speed control circuit gains control of firing the controlled rectifier 22 earlier in the half cycle. FIGURE 2c is illustrative of these effects of the current limiting circuit.

Figure 4:
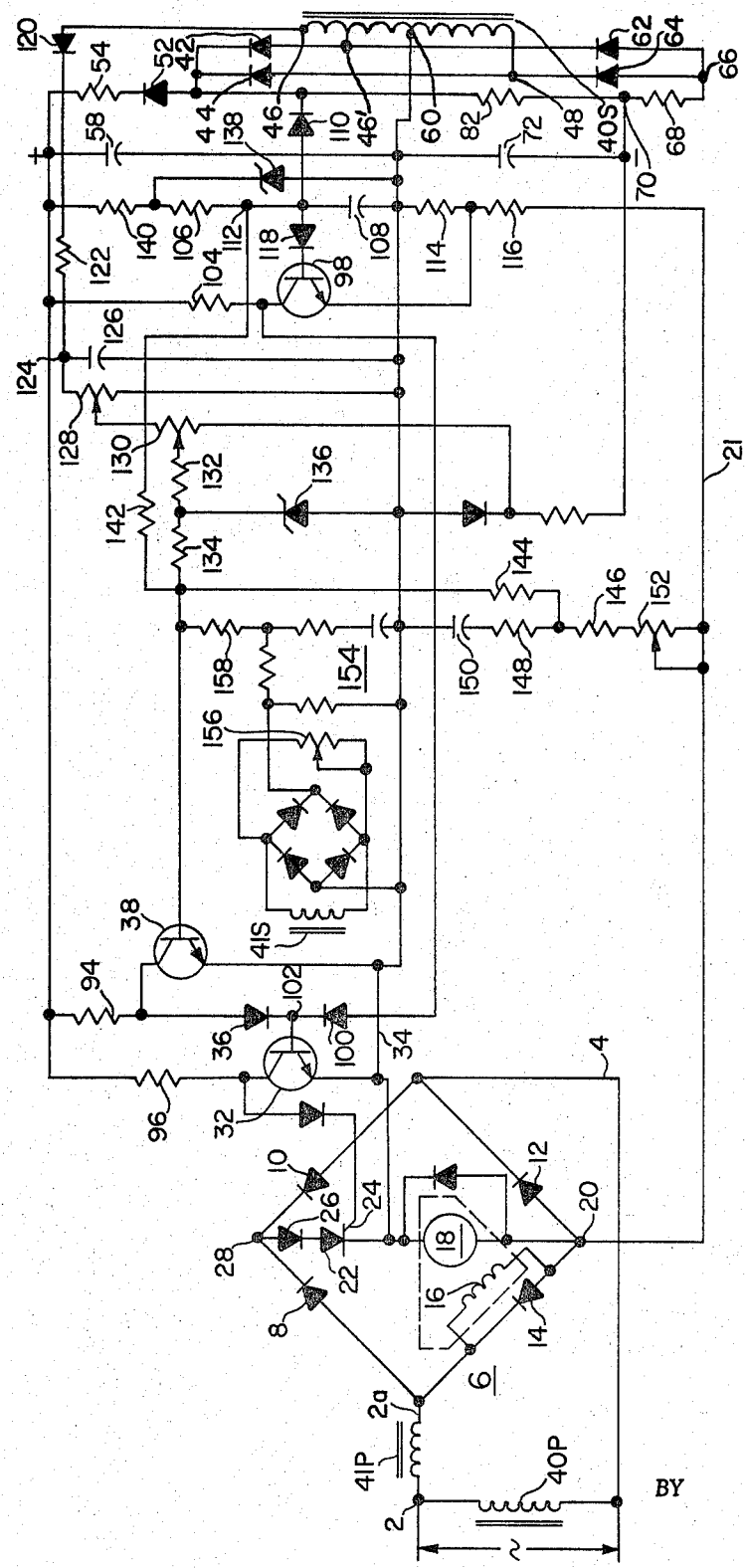
FIGURE 4 shows a schematic diagram of a motor control circuit adapted for use with a high inductance motor in accordance with another aspect of this invention.

FIGURE 4 shows a modified motor control circuit adapted for use with a high inductance motor. This modified circuit includes a separate reference voltage supply comprising a diode 120 having its anode connected to the terminal 146 and its cathode connected through a resistor 122 to a junction 124. The reference voltage is developed across a capacitor 126 and a motor speed reference potentiometer 128. It is coupled from the slidewire of the potentiometer 128 and through the slidewire of a potentiometer 130 and the resistors 132 and 134 to the base electrode of the transistor 38. A Zener diode 136 limits the maximum reference voltage which can be applied across the base and emitter electrodes of the transistor 38.

This circuit shown in FIGURE 4 uses a single sawtooth generator for the current limiting circuit and the basic speed regulating circuit. This sawtooth generator includes the diode 110 and the capacitor 108 across which the sawtooth voltage wave is formed. A Zener diode 138 and a resistor 140 are added to the sawtooth voltage generator to prevent variations in the magnitude of the sawtooth voltage with a change in source voltage. A resistor 142 couples the sawtooth voltage wave from the junction 112 to the base electrode of the transistor 38.

On motors having an appreciable armature inductance, the armature current may tend to become continuous with full-wave operation at low motor speeds. In this instance, circuit operation is enhanced by filtering the armature voltage which is fed back to the current limiting circuit and the basic speed control circuit. An RC filter for this purpose comprises resistors 144, 146, and 148, a capacitor 150, and a potentiometer 152. The potentiometer 152 controls the maximum voltage at which the armature is allowed to operate.

Where a filter is employed in the feedback circuit, an IR compensation circuit may also be required. A suitable IR compensation circuit 154 is shown, energized by means of voltage coupled through a secondary winding 41S of the transformer 41, the primary of which is in series with busses 2 and 2a. The amount of IR compensation current coupled through resistor 158 is controlled by a rheostat 156. Thus, four currents are combined at the base of transistor 38 in FIGURE 4 to affect its operation: The sawtooth generator current from resistor 142, the reference current from resistor 134, the filtered feedback current from resistor 144, and the IR compensation current from resistor 158.

This invention is not limited to the particular details of the preferred embodiments illustrated, and it is contemplated that various modifications and applications within the scope of this invention will occur to those skilled in the art. It is, therefore, intended that the appended claims cover such modifications which do not depart from the direct spirit and scope of this invention.

What we claim as new and desire to secure by Letters Patent of the United States is:

1. For use in a system for controlling the speed of a direct-current motor, having an armature winding and a field winding, by controlling the power supplied from an alternating-current source to the armature, a speed controlling circuit comprising in combination:
   (a) full-wave rectifier circuit means adapted to be connected between the source and the armature to supply direct-current power to the armature;
   (b) controlled rectifier means connected to said full-wave rectifier circuit and adapted to be connected to the armature to control the power supplied to the armature;
   (c) commutating means connected to said controlled rectifier and adapted to be connected to the motor armature;
   (d) first circuit means adapted to be connected to the armature and connected to the input circuit of said controlled rectifier and responsive to the voltage level across the armature for phase controlling the firing of said controlled rectifier;
   (e) second circuit means adapted to be connected to the armature and connected to said first circuit means and responsive to the voltage level across the armature to prevent the firing of said controlled rectifier until a selected phase angle is reached in each half cycle of the rectified voltage, said second circuit means being so constructed and arranged that the selected phase angle varies inversely in magnitude with the voltage level at the armature so that an approximately constant maximum armature current is maintained over the speed range of the motor.

2. A speed control circuit according to claim 1 wherein said commutating means includes a free-wheeling rectifier connected across the motor armature.

3. A speed control circuit according to claim 2 wherein the voltage drops across the rectifiers in said full-wave rectifier, across said controlled rectifier, and across said free-wheeling rectifier are such that the current flow through said controlled rectifier is terminated between succeeding source voltage half cycles for an interval having a duration at least equal to the minimum turn-off time of said controlled rectifier.

4. A speed control circuit according to claim 1 wherein said first circuit means includes means for shunting current from the gate electrode of said controlled rectifier means and means for phase controlling the operation of said shunting means in response to the voltage level across the armature.

5. A speed control circuit according to claim 4 wherein said phase controlling means comprises a semiconductor circuit responsive to a ramp and pedestal voltage dependent in magnitude upon the voltage level across the armature, the last mentioned means including impedance means adapted to be connected across said armature and connected to said semiconductor means to cause the selected phase angle to vary inversely in magnitude with the voltage level at the armature.

6. A speed control circuit according to claim 5 wherein said second circuit means is connected to said shunting means to cause said shunting means to shunt the gate current from said controlled rectifier until the selected phase angle is reached in each half cycle of the rectified voltage, said second circuit means also including means for generating a ramp and pedestal voltage dependent in magnitude upon the magnitude of the voltage level across said armature, means for connecting said generating means to said first circuit means.

7. A system for controlling the speed of a direct-current motor by controlling the power supplied from an alternating-current source to the motor, comprising in combination:
   (a) a direct-current motor having an armature winding and a field winding;
   (b) full-wave rectifier circuit means adapted to be connected to the source and connected to said armature to supply direct-current power to said armature;
   (c) controlled rectifier means connected between said full-wave rectifier circuit and said armature to control the power supplied to said armature;
   (d) commutating means connected to said controlled rectifier and said armature;
   (e) first circuit means connected to said armature and the input circuit of said controlled rectifier and responsive to the voltage level across said armature for phase controlling the firing of said control rectifier;
   (f) second circuit means connected to said armature and to said first circuit means and responsive to the voltage across said armature to prevent the firing of said controlled rectifier until a selected phase angle is reached in each half cycle of the rectified voltage, said second circuit means being so constructed and arranged that the selected phase angle varies inversely in magnitude with the voltage level at said armature so that an approximately constant maximum armature current is maintained over the speed range of said motor.

8. A system according to claim 7 wherein said second circuit means includes a semiconductor circuit and means for generating a ramp and pedestal voltage for controlling the selected phase angle, the last mentioned means including impedance means connected across said armature and connected to said semiconductor means to cause the selected phase angle to vary inversely in magnitude with the voltage level at said armature.

9. A system according to claim 8 wherein said first circuit means includes means for shunting current from the gate electrode of said controlled rectifier means and means for phase controlling the operation of said shunting means in response to the voltage level across said armature.

10. A system according to claim 9 wherein said second circuit means is connected to said shunting means to cause said shunting means to shunt the gate current from said controlled rectifier until the selected phase angle is reached in each half cycle of the rectified voltage, said second circuit means also including means for generating a ramp and pedestal voltage dependent in magnitude upon the magnitude of the voltage level across said armature, means for connecting said generating means to said first circuit means.

11. A system according to claim 7 wherein said commutating means includes a free-wheeling rectifier connected across said motor armature.

12. A system according to claim 11 wherein the voltage drops across the rectifiers in said full-wave rectifier, across said controlled rectifier, and across said free-wheeling rectifier are such that the current flow through said controlled rectifier is terminated between succeeding source voltage half cycles for an interval having a duration at least equal to the minimum turn-off time of said controlled rectifier.

13. A semiconductor, controlled rectifier circuit for supplying power to an inductive load comprising: full-wave rectifier circuit means; controlled rectifier means connected to said full-wave rectifier circuit means; the diode of said full-wave rectifier circuit means and said controlled rectifier means having forward voltage drops such that the current flow through the controlled rectifier means is terminated between succeeding voltage half cycles for an interval having a duration at least equal to the minimum turn-off time of said controlled rectifier means; commutating means connected to said controlled rectifier means and to said inductive load; and circuit means connected to the input of said controlled rectifier means for phase controlling the firing of said controlled rectifier means.

14. A circuit according to claim 13 wherein said full-wave rectifier circuit means comprises a bridge rectifier circuit and such additional diode means as is required to terminate current flow for at least the minimum turn-off time.

15. A circuit according to claim 13 wherein the load comprises the armature winding of a direct-current motor and the last-mentioned circuit means is connected to the armature winding and responsive to the voltage level thereacross.

References Cited

UNITED STATES PATENTS

| 2,977,523 | 3/1961 | Cockrell | 318—331 |
| 3,064,174 | 11/1962 | Dinger | 318—331 |
| 3,204,172 | 8/1965 | Darling et al. | 323—22 X |

ORIS L. RADER, *Primary Examiner.*

K. L. CROSSON, *Assistant Examiner.*

U.S. Cl. X.R.

318—341